United States Patent [19]
Birkmann et al.

[11] Patent Number: 5,474,250
[45] Date of Patent: Dec. 12, 1995

[54] WINDING DEVICE FOR MAGNETIC TAPES

[75] Inventors: Josef Birkmann, Fürstenfeldbruck; Bernd Scholtysik, München, both of Germany

[73] Assignee: BASF Magnetics GmbH, Mannheim, Germany

[21] Appl. No.: 14,273

[22] Filed: Feb. 5, 1993

[30] Foreign Application Priority Data

Feb. 6, 1992 [DE] Germany ............... 42 03 310.1
Feb. 6, 1992 [DE] Germany ............... 9201432 U

[51] Int. Cl.⁶ .................................... B65H 18/08
[52] U.S. Cl. ............................. 242/547; 242/548
[58] Field of Search .................. 242/67.1 R, 76; 226/190, 196, 197, 199

[56] References Cited

U.S. PATENT DOCUMENTS

| | | | |
|---|---|---|---|
| 3,021,041 | 2/1962 | Maksymiak et al. | 242/76 |
| 3,132,818 | 5/1964 | Hansen et al. | 422/67.1 R |
| 3,224,698 | 12/1965 | Conti | 242/67.1 R |
| 3,602,448 | 8/1971 | Muensterer | 242/67.1 R |
| 3,643,849 | 2/1972 | Roberts | 226/199 |
| 4,091,979 | 5/1978 | Browder | 242/76 X |
| 4,300,714 | 11/1981 | Dahl et al. | 226/196 |
| 4,336,900 | 6/1982 | Pontoni | 242/76 X |
| 4,829,645 | 5/1989 | Kannwischer | 226/190 X |
| 4,858,843 | 8/1989 | Gierse et al. | 242/67.1 R X |
| 5,050,028 | 9/1991 | Schandl | 226/199 X |

FOREIGN PATENT DOCUMENTS

| | | | |
|---|---|---|---|
| 297609 | 1/1989 | European Pat. Off. | |
| 3908451A1 | 9/1980 | Germany . | |
| 3818113A1 | 12/1988 | Germany . | |
| 80203 | 7/1978 | Japan | 242/76 |
| 454584 | 2/1975 | U.S.S.R. | 242/76 |
| 2223006 | 3/1990 | United Kingdom . | |
| 2223006 | 3/1990 | United Kingdom . | |

Primary Examiner—Daniel P. Stodola
Assistant Examiner—Eileen A. Dunn
Attorney, Agent, or Firm—Keil & Weinkauf

[57] ABSTRACT

A winding device for magnetic tapes, in which the incoming tape (1) is guided over tape-deflecting and guiding elements (3, 4) to the tape roll (7) for winding up, a rubber roller (5) fastened to a low-mass swing arm (6) being pressed against the tape at the point at which the tape tangentially reaches the tape roll, and both the swing arm and the tape-deflecting elements being seated on a pivotal guide arm, which is guided by a pneumatic guidance according to the structure of the tape roll. In this way, a satisfactory winding profile is achieved in the case of magnetic tapes to be wound up, even at high winding speeds.

3 Claims, 3 Drawing Sheets

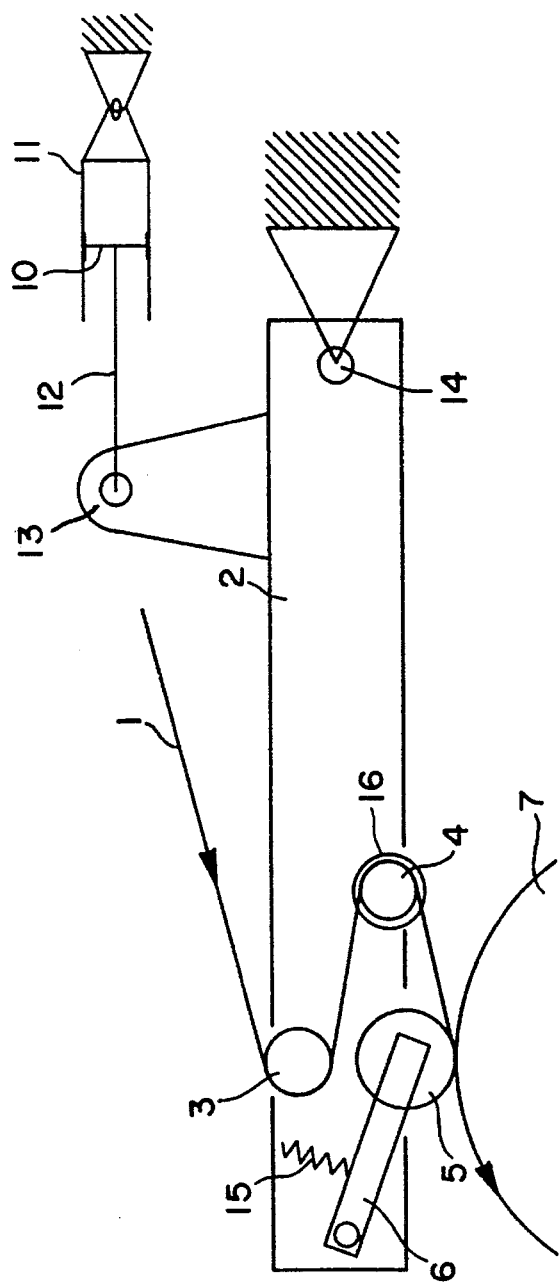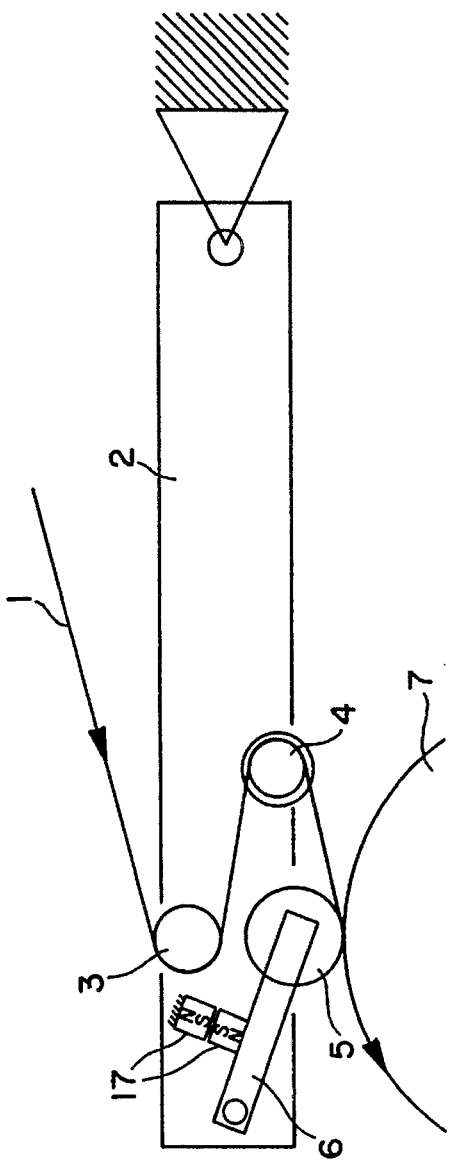

WINDING DEVICE FOR MAGNETIC TAPES

BACKGROUND OF THE INVENTION

1. Field of the Invention

The invention relates to a winding device for recording media in tape form, in particular magnetic tapes, having at least one tape roll element, which can be rotatably driven in order to wind the tape up, the tape being pressed against the roll at the point where the tape is being wound up onto the roll by a pinch roller connected to a movable guide arm and having a flexible bearing surface.

2. Description of the Related Art

The prior art discloses systems for producing tape strips in which a continuous film web is cut longitudinally into individual film strips. This takes place with the aid of a row of fixed cutting knives which are arranged perpendicularly to the web running direction, are at equal intervals from one another and project into the web with their cutting edges directed against the web movement. The finished film strips are then wound up individually on reels or flangeless hubs on a take-up unit. In this case, the individual take-up units may be arranged in a row one behind the other or next to the other in the running direction of the film strips or, if there is quite a large number of film strips to be wound up, a plurality of rows of take-up units may also be arranged at levels one above the other.

Such systems are disclosed, for example, by German Laid-Open Application DOS 3,908,451 or by European Patent 0,297,609.

When winding up film strips, it is very important for a satisfactory appearance of the tape roll to be achieved, without overhanging turns of tape. This is achieved, for example, by German Laid-Open Application 3,818,113 in that, when producing a tape roll, a magnetic field generating device acts in a predetermined direction to attract the magnetic tape. In the said German application, further winding apparatuses are described, in which a circulating highly flexible endless belt presses the magnetic tape to be wound up against the roll in order in this way to wind the tape up neatly and firmly.

Furthermore, a winding device is known such as that represented in FIG. 1. The incoming tape strip (1) runs over a guide roller (3) having lateral rims and then over a roller (5) which has a flexible surface and presses the tape against the tape roll (7) to be wound up. Tape guide (3) and flexible roller (5) are seated on the end of a movable guide arm (2). A disadvantage of this winding apparatus is that the guide arm cannot follow rapid vertical deflections of the tape roll owing to its mass and its moment of inertia. These vertical deflections are caused by a poor centering of the hubs on the hub mounting of the winding apparatus as well as by deviations of the hub or of the tape roll from the ideal circular shape, which can occur as a result of the tape roll being compressed unevenly over its circumference when being wound under high pressure. In the case of such an arrangement, it has been observed that the vertical deflections of the guide arm described have a poor winding profile as a consequence.

A winding profile which in itself is very smooth is achieved by the winding apparatus represented in FIG. 2, as sold for example by the company Dusenberry. In this case, the incoming tape strip is wound up onto the tape roll (7) via a tape-guiding roller (8) having lateral rims (9), which guide the outer turns of said tape roll. The spacing of the lateral rims (9) from each other is only slightly greater than the width of the tape strip (1). Nevertheless, shiny and scraped places, which spoil the visual impression of the winding profile, occur on the side surfaces of the tape roll. Moreover, at high winding speeds, the winding roller tends to lift slightly off the tape roll, owing to the vertical deflection of the tape roll, as a result of which the tape can veer somewhat sideways. Upon the next-following revolution of the tape roll, the protruding tape is then damaged by the lateral rims (9) of the guide roller (8).

Cutting machines, loaders and winders contain numerous rotatable rollers, provided with lateral flanges, for deflecting the strips. Said rollers can consist of plastics material or of metal. The following problems can occur in the deflection of the magnetic tape strips on these deflecting rollers:

When the magnetic tape is cut into strips, waste (fibers, dust etc.) can be caused at the edges and damage the surface of the magnetic tape if it settles on the rollers or adheres to the magnetic tape, and thus can give rise to signal noise, known as dropouts.

In the case of prolonged use of the abovementioned machines, the rotatable deflecting rollers can jam, so that the magnetic tape drags or rubs over the surface of the rollers and is thereby damaged.

In the case of high running speeds, the rollers do not rotate at the tape speed, particularly in the case of a small angle of wrap, so that friction occurs on the rims.

The running surface of the deflecting rollers can be damaged in the case of a prolonged service life.

The edges of the magnetic tape strips can be damaged by the flanges.

An improved roller in which the running surface is hardcoated, channel-like incisions being located between the flanges and the running surface, is disclosed by DE-U 8,811,603.

Furthermore, non-rotatable deflecting elements have been disclosed for the abovementioned purposes, to the running surface of which compressed air is applied from inside in order to avoid scratching of the film strips and in order in this way to guide the strips on an air cushion. It has been observed in this case that the lateral, likewise fixed flanges can damage the tape edges, in particular in the case of a high transport speed. Owing to the loading of the rim disks by the tape, they grind in, which can lead to damage to the tape edges.

SUMMARY OF THE INVENTION

It is therefore an object of the present invention to find a winding apparatus of the generic type mentioned at the beginning which does not have the disadvantages of the prior art stated above and which has as a consequence a satisfactory smooth winding profile, particularly even at high winding speeds.

We have found that the object is achieved according to the invention by a winding device having the features mentioned in the characterizing part of claim 1. Further details of the invention emerge from the sub-claims, the drawings and the description.

BRIEF DESCRIPTION OF THE DRAWING

In FIGS. 1–5,

FIGS. 1–2 represent winding devices according to the prior art,

FIGS. 3–4 represent two preferred embodiments of winding devices according to the invention, FIG. 5 represents a plan view of a deflecting roller for a winding device according to the invention.

DESCRIPTION OF THE PREFERRED EMBODIMENT

Figure 1:
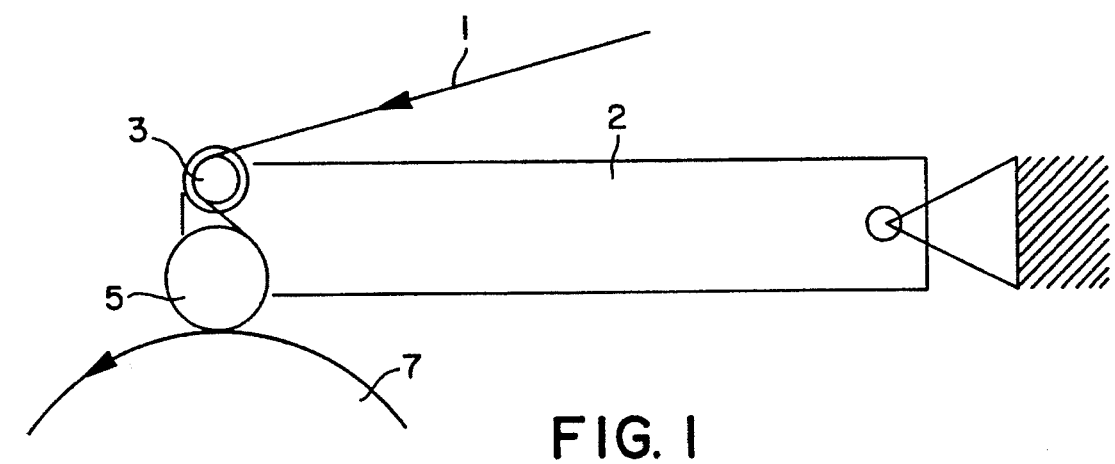
Figure 2:
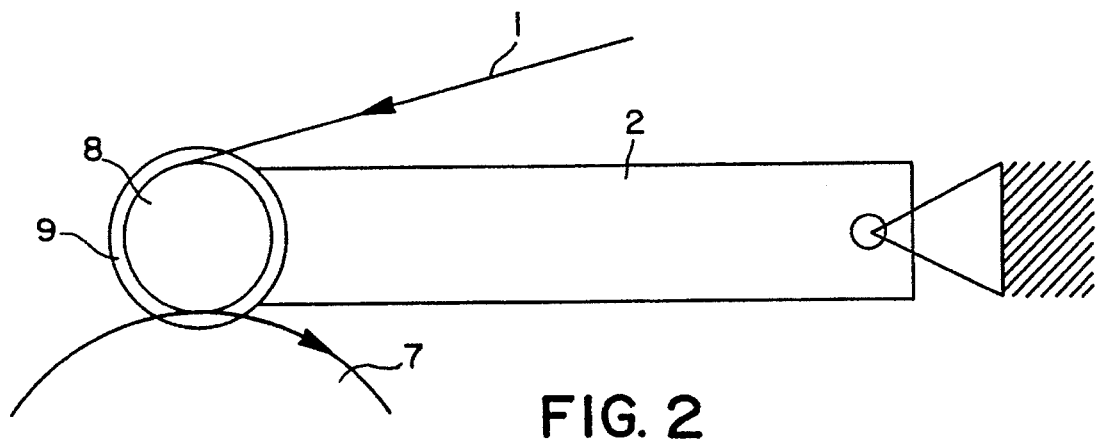

The invention is explained in more detail below with reference to FIG. 3. In this case, the tape strip (1) runs initially over a tape-deflecting roller (3) and a further tape-guiding roller (4) having lateral rims (16) and is then wound up onto the tape roll (7). According to the invention, at the point at which the tape arrives tangentially at the tape roll there is a roller (5) having a flexible contact surface, which is mounted pivotally on a low-mass swing arm (6). The tape (1) is thus wrapped around the pinch roller (5) only at a small angle. The tape-deflecting elements (3, 4) and the arm (6) are mounted on the pivotal guide arm (2). In a preferred configuration, the latter is connected by means of a rod (12) to a piston (10), which is driven by means of the pneumatically operated cylinder (11), and the point of application (13) of the rod is in the vicinity of the pivot point (14) of the guide arm. In this way, the guide arm can be pivoted according to the structure and size of the tape roll. The swing arm (6) is pressed with the roller (5) against the tape roll (7) by a compression spring (15) or, alternatively to this, by a tension spring (not shown) or a magnetic actuation.

A possibility for magnetic actuation of the swing arm (6), in order to effect the pressing against the tape roll, is revealed by FIG. 4. In this case, like magnetic poles (17) opposite each other are firmly connected to the swing arm (6) and the guide arm (2) respectively, in order in this way to effect a repulsion of the magnet poles and consequently the desired pressing of the roller (5) against the tape roll (7).

Whereas in the case of pressing the roller (5) against the tape roll (7) by means of a spring system there is a linear increase in the spring force with the displacement, in the case of a magnetic actuation by means of repelling magnets a clearly progressive force-displacement characteristic is obtained. Of course, combinations of spring and magnet systems for pressing the roller (5) against the tape roll are also possible.

The tape-guiding and tape-deflecting elements (3, 4) may either by rotatable, or as an alternative to this they may also be stationary and subjected to compressed air on their tape-contacting surface, in order in this way to effect an air-cushion guidance of the tape (1) around the deflecting elements. Furthermore, the tape-guiding element (4) may comprise an air deflection with rotatable rims for lateral guidance of the magnetic tape.

It has been found that, with the apparatus according to the invention, a satisfactory smooth winding profile is achieved in comparison with the rolls produced according to the prior art, as the following comparison shows. For this purpose, a tape roll was produced on a winding device as shown in FIG. 1 at a winding speed of 400 and 600 m/min until the tape roll had a diameter of 35 cm. Using a commercially available peak-to-valley measuring instrument, the winding profile of the side surface of the tape roll was measured as peak-to-valley height $R_a$. In contrast to this, a tape roll was produced with the same diameter and at the same winding speeds by the winding device according to the invention as shown in FIG. 3 and the peak-to-valley height $R_a$ was likewise measured by means of the instrument just described.

The comparison shows the following values

| Winding device as shown in | Peak-to-valley height of the roll side surfaces | |
|---|---|---|
| | $R_a$ at 400 m/min | $R_a$ at 600 m/min |
| FIG. 1 (prior art) | 3.7 μm | 7.4 μm |
| FIG. 3 (invention) | 1.9 μm | 2.6 μm |

The improvement in the winding profile effected by the invention becomes more pronounced with increasing winding speed.

Figure 5:
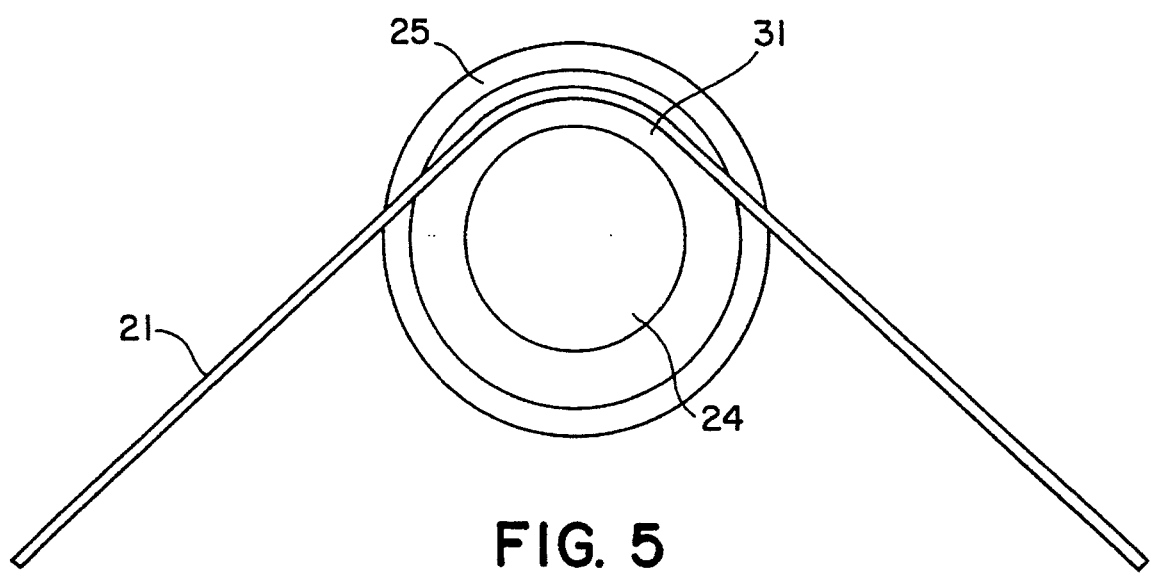
Figure 6:
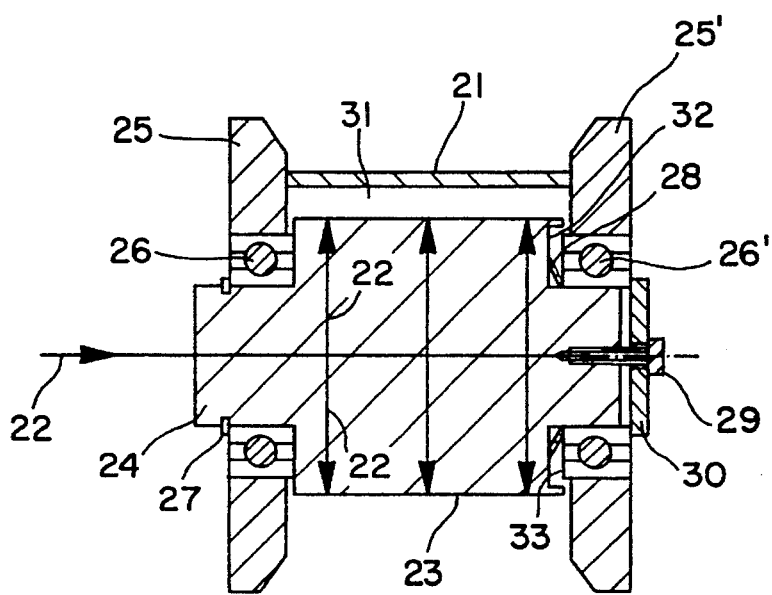
FIG. 6 represents a cross section of the deflecting roller according to FIG. 5.

As represented in FIGS. 5 and 6, the deflection of the tape strip (21) is served in the design of the tape guidance by an air cushion (31) which is produced when compressed air (22) supplied through bores or a porous surface of the running surface (23) of the basic element (24) emerges below the tape strip (21). Lateral guidance of the tape strip is served by two flanges (25, 25') which are rotatably mounted on the basic element (24) by means of roller or ball bearings (26). The lateral spacing of the two flanges (25, 25') corresponds to the width of the tape strip (21). The spacing of the flanges has to be accurate to a few thousandths of a millimeter for good guidance of the tape strip. In order to achieve this without a high outlay on production engineering, one of the bearings (26) can be fixed in an axially rigid fashion by means of suitable measures, for example a locking ring (27), and the second bearing (26') can be constructed in an adjustable fashion with respect to a spring element (28), for example a plate spring, by means of a screw (29) and a washer (30), the plate spring being located between the side surface (32) of the hollow cylindrical basic element and the inside (33) of the bearing. The bearing outer rings of the two bearings (26) can also serve as the lateral guide rim of the tape.

In the described design of the tape guidance, the friction of the tape strip which otherwise occurs in the case of air deflections on the stationary guiding flanges is avoided, as a result of which a careful treatment of the tape edges is achieved.

It has been found that satisfactory guidance of the tape is possible with the deflecting element according to the innovation even at tape speeds of 400 to 600 m/min. In this case, the spacing of the two flanges (25, 25') may also be slightly smaller than the tape strip width.

We claim:

1. A winding device for tape strips, having at least one roll element, which can be rotatably driven in order to wind the tape strip to form a tape roll, the tape strip being pressed against the roll at the point where it is being wound onto the tape roll element by a pinch roller connected to a pivotal guide arm and having a flexible bearing surface, wherein the tape strip is guided by tape-deflecting elements and guiding elements, mounted on the pivotal guide arm in such a way that, approximately at the point at which the pinch roller rests on the tape roll, said tape strip reaches said roll tangentially, so that only a small part of the circumference of the pinch roller is in contact with the tape strip the pinch roller is rotatably fitted on a low-mass swing arm, which swing arm is mounted pivotally on the pivotal guide arm so that in operation it extends in the direction opposite to the direction of the pivotal guide arm generally An the direction of the pivot point of said pivotal guide arm, the weight of the swing arm being less than the weight of the pivotal guide arm the pinch roller is pressed against the tape roll by magnetic actuation acting on the swing arm the tape-deflecting element comprises a hollow cylinder which is provided with a running surface which is provided with bores, which cylinder is also provided with two lateral flanges which limit the running surface, compressed air being applied to the running surface, of the hollow cylindrical tape-deflecting element from inside the hollow cylindrical tape-deflecting element in order to form an air cushion below the tape strip, and the two lateral flanges being rotatably mounted on the hollow cylindrical tape-deflecting element by means of bearings.

2. A winding device as claimed in claim 1, wherein one bearing of the deflecting element is fixed axially by a locking ring, while the other bearing can be axially adjusted against the force of a spring element inserted between the cylinder side surface and the inside of the bearing by means of a screw which can be turned inwards axially, 3. A winding device for tape strips as claimed in claim 1, wherein the axial space between the insides of the two flanges of the deflecting element is equal to or slightly smaller than the width of the tape strip.

* * * * *

UNITED STATES PATENT AND TRADEMARK OFFICE
CERTIFICATE OF CORRECTION

PATENT NO.: 5,474,250

DATED: December 12, 1995

INVENTOR(S): BIRKMANN et al.

It is certified that error appears in the above-identified patent and that said Letters Patent is hereby corrected as shown below:

Claim 1, column 5, line 1, "An" should be --in--.

Signed and Sealed this

Twenty-sixth Day of March, 1996

*Attest:*

BRUCE LEHMAN

*Attesting Officer*     *Commissioner of Patents and Trademarks*